16-117
11/4/86 SR RE 32,273

United States Patent [19]

Guild

[11] E Patent Number: Re. 32,273

[45] Reissued Date of Patent: Nov. 4, 1986

[54] APPARATUS FOR SELECTIVELY VARYING THE LONGITUDINAL POSITION OF A SKIER ON A PAIR OF SKIS

[76] Inventor: William H. Guild, Eagle Mountain Rd., Jackson, N.H. 03846

[21] Appl. No.: 591,866

[22] Filed: Mar. 21, 1984

Related U.S. Patent Documents

Reissue of:

[64] Patent No.: 4,358,904
Issued: Nov. 16, 1982
Appl. No.: 163,178
Filed: Jun. 26, 1980

[51] Int. Cl. ..... A43B 5/04
[52] U.S. Cl. ..... 36/117
[58] Field of Search ..... 36/117-121, 36/132; 280/623, 613, 611, 636

[56] References Cited

U.S. PATENT DOCUMENTS

| | | | |
|---|---|---|---|
| 2,849,237 | 8/1958 | Simithis | 36/132 X |
| 3,758,965 | 9/1973 | Caberlotto | 36/117 |
| 3,992,789 | 11/1976 | Dikoff | 36/117 |
| 4,060,256 | 11/1977 | Collombin et al. | 36/117 |
| 4,078,322 | 3/1978 | Dalebout . | |
| 4,177,584 | 12/1979 | Beyl | 36/117 |
| 4,273,354 | 6/1981 | George | 36/117 |

FOREIGN PATENT DOCUMENTS

| | | | |
|---|---|---|---|
| 2358117 | 2/1978 | France | 36/117 |

*Primary Examiner*—James Kee Chi
*Attorney, Agent, or Firm*—John A. Haug

[57] ABSTRACT

A two part ski boot, one part being slidably connected to the other part, such as through a tongue and groove arrangement, is shown in which the parts may be locked to one another in any of a plurality of locations. A series of bores extending transversely through the tongue and groove are provided so that at least one bore in one part can be brought into alignment with a bore in the other part and a pin can be received in the aligned bores to lock the parts together. The tongue and groove may extend the full length of the boot or only a portion of its length. An end cap can be attached to the open end of the boot if desired.

11 Claims, 5 Drawing Figures

APPARATUS FOR SELECTIVELY VARYING THE LONGITUDINAL POSITION OF A SKIER ON A PAIR OF SKIS

Matter enclosed in heavy brackets [ ] appears in the original patent but forms no part of this reissue specification; matter printed in italics indicates the additions made by reissue.

BACKGROUND OF INVENTION

The invention relates generally to ski equipment and more particularly to apparatus for providing longitudinal adjustment of the position of a skier on a pair of skis.

It is well known that the position of the bindings on a pair of skis is important in order to obtain the maximum performance characteristics designed into the skis. In designing a particular ski the manufacturer attempts to determine the optimum binding location and then provide this information to the public, particularly the ski shops where bindings are mounted to skis, so that the technician has the required information for placing the binding in the best location. However, due to slight differences from one ski to another, even of the same design, in practice it is found that the so-called sweet spot is frequently missed. Missing the sweet spot by as little as a fraction of an inch can drastically affect the performance of the ski.

Although bindings can be remounted without adversely affecting the ski, as long as the screw holes do not over lap, they can only be remounted once. That is, it is generally recognized, that three or more sets of holes in the ski weakens it beyond an acceptable level. Therefore, if the person mounting the bindings does not find the [sweep] *sweet* spot in his second attempt, he can make no further changes without adversely affecting the ski.

In U.S. Pat. No. 3,926,451 a solution to this problem is shown and described in which a longitudinally adjustable plate is received in opposed grooves formed in side walls of a ski and with the bindings, in turn, attached to the plate. This plate and concommitantly the binding can be moved—fore or aft—so that the binding can be positioned at precisely the sweet spot for that specific ski. In addition, when the skier wishes to change the location of the bindings temporarily due to a change in snow conditions, terrain, or some other reason, he can easily do this and then return the bindings to their original position whenever he desired without weakening the skis in any way and without having to go to a ski shop to effect the relocation.

However, even though excellent longitudinal adjustment of the position on a ski is provided by the aforementioned patent, it requires that the ski be specifically made to accomodate and capture the slidable plate.

It is an object of this invention to provide means for enabling the longitudinal adjustment of the location of a skier on a pair of skis which can be used with any standard pair of skis and standard bindings.

Another object of the invention is the provision of apparatus which will enable a skier to change has position on a pair of skis without adversely affecting the characteristics designed into the ski.

Various additional objects and advantages of the present invention will become readily apparent from the following detailed description and accompanying drawings.

SUMMARY OF THE INVENTION

Briefly, the above objects are realized by providing a two part ski boot, slidably attached to one another. One part is integrally attached to the upper of the boot and is formed with one portion of a tongue and groove assembly, while the other part, including the flat sole piece adapted to be placed on the top surface of a ski, is formed with the other portion of the tongue and groove assembly. The groove extends from the front or toe portion of the boot to the back or heel portion of the boot and forms a track for the tongue to slide in from fore to aft. A plurality of transversely extending bores are formed through the tongue and groove so that at least one bore in one part will be alignable with a bore in the other part in any of a plurality of selected locations. A pin is received in the aligned bores to lock the parts together.

A single bore may be in communication with the external surface of the boot, with a plurality of bores alignable therewith extending through an interior portion of the boot not exposed to the external surface; or, a plurality of bores may be in communication with the external boot surface, alignable with the bores extending the interior portion of the boot thereby allowing the several bores to be more widely spaced from one another. The tongue and groove may extend the full length of, or only a portion of the length of the boot. If desired, a cap may be used to cover the tongue and groove at the end of the boot.

BRIEF DESCRIPTION OF THE DRAWINGS

In the accompanying drawings—in which several of the preferred embodiments of the invention are illustrated.

Figure 1:
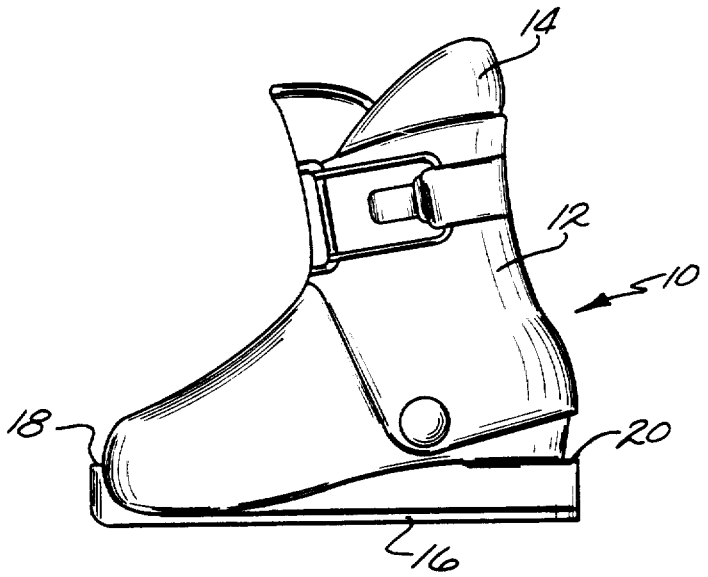
FIG. 1 is a side view of a conventional ski boot.
Figure 2:
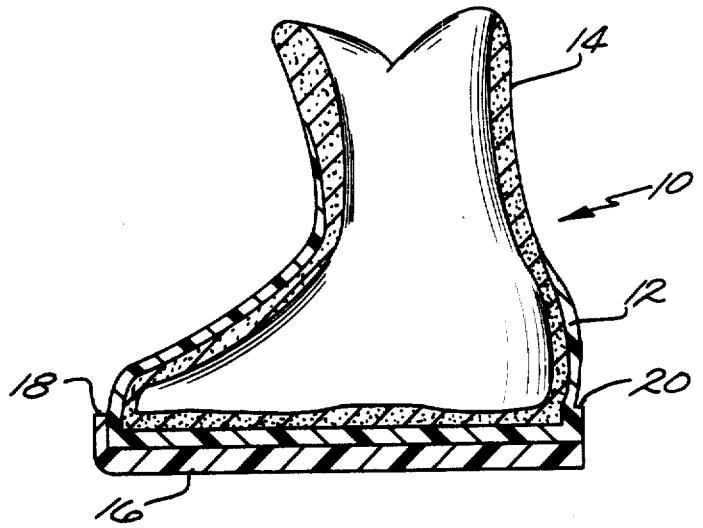
FIG. 2 is a cross sectional view of the FIG. 1 view.

Dimensions of certain parts as shown in the drawings, may have been modified or exaggerated for the purpose of clarity of illustration.

DESCRIPTION OF THE PREFERRED EMBODIMENTS

Referring now to the drawings, numeral 10 indicates, generally, a conventional ski boot, including an upper 12 which is adapted to receive therein a conventional bladder 14, a rigid, flat sole 16 is fixedly attached to the upper of the boot in a conventional manner as by integrally molding therewith or bonding thereto, and is formed with a toe plateau 18 and a heel plateau 20, which cooperate with the bindings on the ski to securely fasten the boot to the ski.

Figure 3:
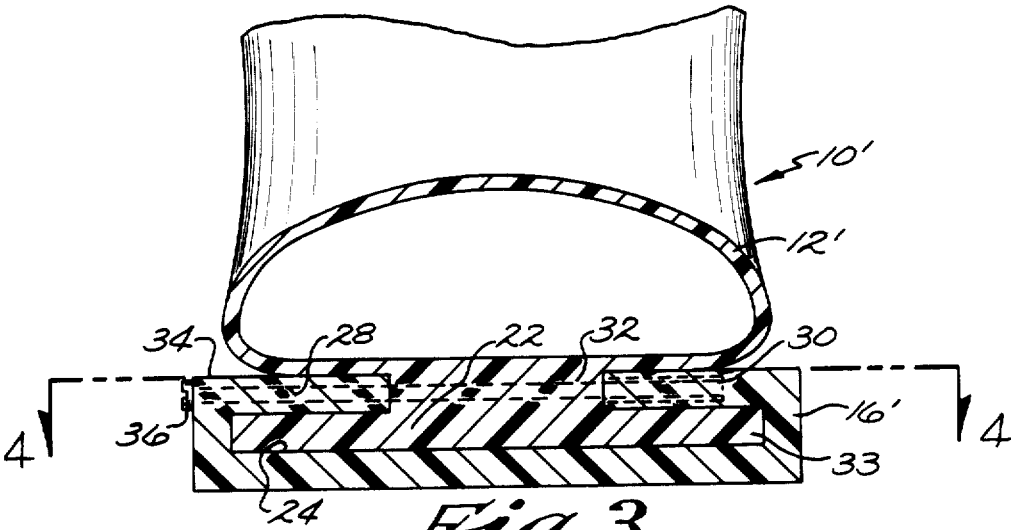
FIG. 3 is a cross sectional view taken along lines 3—3 of FIG. 4 through the toe portion of a boot made in accordance with the invention.
Figure 4:
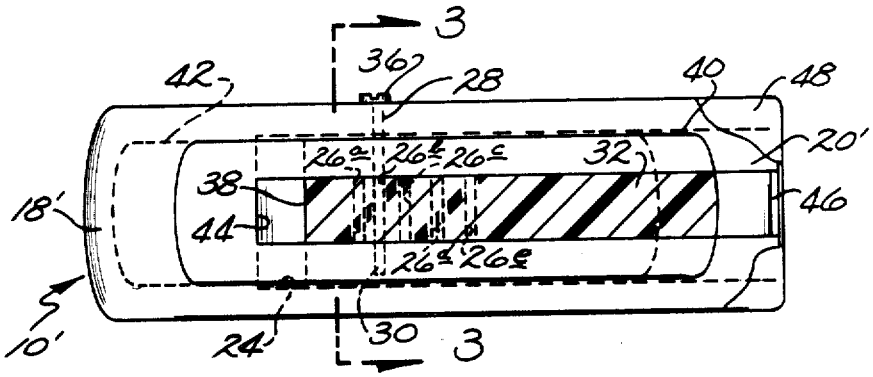
FIG. 4 is a cross sectional view taken on lines 4—4 of FIG. 3.

In accordance with the invention, the boot is made so that it is formed of two separate parts which are moveable relative to one another. As seen in FIGS. 3 and 4, upper 12' is formed with a longitudinally extending tongue 22 which projects downwardly from the upper and depends therefrom. Sole 16' is provided with a longitudinally extending groove or tract 24. Both tongue 22 and groove 24 extend from the front or toe portion toward the back or heel portion of boot 10'.

Tongue 22 is dimensioned so that it closely fits and is slidably movable within groove 24.

Thus, upper part 12' is movable relative to sole part 16' in a longitudinal direction with the upper part 12' movable fore and aft relative to sole part 16'. Preferably, tongue 22 is formed in an inverted "T" shaped configuration with a vertical neck portion 32 attached to the upper, and with the horizontal plate like portion 33 extending essentially the full width of the sole to provide optimum stability.

A plurality of transversely extending bores extend through the tongue and groove assembly so that parts 12' and 16' can be locked together in a selected position. As seen in FIG. 4, a plurality of bores 26a–e extend through neck portion 32 of tongue 22 while a single bore 28 extends through the top wall 34 of sole 16'. Bore 28 communicates with an external surface of the boot for reception of a locking member 36. Bore 28 may extend from an external surface on one side of the boot entirely across the width of the boot to the external surface of the opposite side of the boot, or it may project only a portion of the way beyond the neck portion 32, as seen in FIG. 4, and may be provided with a threaded end 30. Thus, locking member 36 can be in the form of screw or pin having a threaded end portion.

Upper 12' can be moved so that bore 28 is in alignment with any of bores 26a–e and when in alignment locking member 36 can be inserted to lock upper 12' to sole 16'. It will be noted that in FIG. 4 locking member 36 is received in bore 26b with the location of upper 12' indicated by line 40. Dashed line 42 indicates the location of upper 12' when the upper is moved to a different position with the upper 12' further forward relative to sole 16'. In the FIG. 4 embodiment the upper is limited in its forward movement relative to sole 16' by the end 38 of tongue 22 abutting stop surface 44 in sole 16'.

Track 24 is shown in FIG. 4 to run all the way to the heel end of sole 16' to facilitate assembly of the two parts of the boot to each other. Once the parts are so assembled, if desired, a cap 48, which is shown broken away in FIG. 4, can be placed over the heel end of sole 16' beyond end 46 of tongue 22, to close the track and form heel plateau 20'. Cap 48 can be snapped on or permanently attached, as desired.

Figure 5:
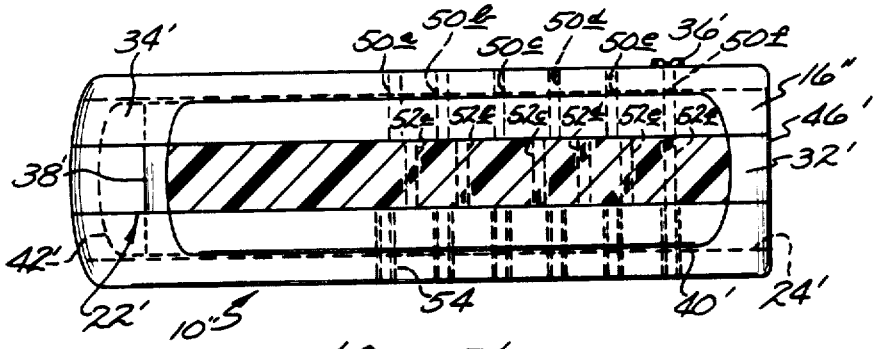
FIG. 5 is a view similar to the FIG. 4 but of a second embodiment of the invention.

With reference to FIG. 5, an alternate embodiment is shown in which track 24' extends the full length of sole 16''. Spaced bores 50a–f extend transversely through top wall 34' of sole 16'' and may, if desired, have a portion thereof threaded, as seen at 54. Another set of bores 52a–f extend transversely through neck 32' of tongue 22' and are spaced so that as the upper and sole of boot 10'' are moved relative to one another, different bores will come into alignment with one another, to permit reception of locking member 36' as shown in FIG. 5, with bores 50f and 52f in alignment and with locking member 36' received therein. Thus, a plurality of selected locations are provided in which the two parts of the boot can be locked together.

It will be noted that tongue 22' extends from a front surface 38' to a rear surface 46' so that the upper can be moved, relative to sole 16'', from the solid line position 40' to the dashed line position 42', without having the tongue project beyond the end of sole 16''.

It will be understood that other tongue and groove configurations can be employed within the perview of the invention and that various materials can be used in making the sole and the upper. However, it is preferred to use the same material for each of the parts to minimize thermal expansion problems which might otherwise tend to interfere with the movement of the parts relative to one another. If desired, a metallic reinforcing member can be disposed within the tongue and/or sole member to provide extra rigidity.

Although the invention has been described with respect to specific, preferred embodiments thereof, many variations and modifications will become apparent to those skilled in the art. It is the intent that the appended claims be interpreted as broadly as possible, in view of the prior art to include all such variations and modifications.

I claim:

1. A boot having a front *toe* end portion and a back *heel* end portion formed on a longitudinal axis, the boot particularly adapted for mounting to snow skis comprising an upper portion of the boot configured to receive a foot and a two part sole member, the first part *includes both the toe end portion and the heel end portion being* movable relative to the second part, the first part formed integrally with the upper portion of the boot and depending therefrom, the second part being attachable to the ski and means to restrict movement of the first part relative to the second part along the longitudinal axis.

2. A boot according to claim 1 in which the second part of the sole is formed with a slot and the first part of the sole is formed with a tongue which is slidably received in the slot of the first part.

3. A boot according to claim 2 in which the slot and tongue are generally "T" shaped in cross section.

4. A boot according to claim 1 in which means are provided to lock the first part to the second part in an adjustable, selected location.

5. A boot according to claim 2 in which at least one bore extends transversely from outside the second part and communicates with the slot and a plurality of transversely extending bores extend through the tongue, each being alignable with the at least one bore in the second part as the parts are moved relative to one another, and a locking member being receivable through the at least one bore and one of the plurality of bores to lock the two parts together.

6. A boot according to claim 5 in which the locking member is threaded and the bores in at least one of the two parts are threaded.

7. A boot according to claim 2 in which the slot extends from a position intermediate the front and back end portions and communicates with one of the end portions.

8. A boot according to claim 7 in which the slot communicates with the back end portion.

9. A boot according to claim 7 in which a cap is attached to the end portion of the sole in which the slot is in communication to close that end portion.

*10. A boot having a front toe end portion and a back heel end portion formed on a longitudinal axis, the boot particularly adapted for mounting to snow skis comprising an upper portion of the boot configured to receive a foot and a two part sole member, the first part includes both the toe end portion and the heel end portion being movable relative to the second part, the first part formed integrally with the upper portion of the boot and depending therefrom, the second part being attachable to the ski and means to restrict placement of the first part relative to the second part to a selected position along the longitudinal axis.*

*11. A method for adjusting the longitudinal location of a skier on a pair of skis to a selected sweet spot along a longi-*

*tudinal axis of the skis comprising the steps of taking a pair of ski boots, each having a first portion adapted to receive a foot and a second portion adapted to be attachable to conventional binding apparatus on a ski, the portions being movable relative to one another, and moving the first portion relative to the second portion to change the location of the first portion to the selected location on the ski, and fixing the location of the first portion relative to the second portion at the selected location.*

* * * * *